US012193131B2

(12) United States Patent
Moon

(10) Patent No.: US 12,193,131 B2
(45) Date of Patent: Jan. 7, 2025

(54) INDUCTION WOK

(71) Applicant: NuWave, LLC, Libertyville, IL (US)

(72) Inventor: Jung S. Moon, Long Grove, IL (US)

(73) Assignee: NuWave, LLC, Vernon Hills, IL (US)

( * ) Notice: Subject to any disclaimer, the term of this patent is extended or adjusted under 35 U.S.C. 154(b) by 307 days.

(21) Appl. No.: 15/866,159

(22) Filed: Jan. 9, 2018

(65) Prior Publication Data
US 2018/0199401 A1 Jul. 12, 2018

Related U.S. Application Data

(60) Provisional application No. 62/443,879, filed on Jan. 9, 2017.

(51) Int. Cl.
H05B 6/12 (2006.01)
A47J 27/00 (2006.01)

(52) U.S. Cl.
CPC ............ H05B 6/1227 (2013.01); A47J 27/00 (2013.01); Y02B 40/00 (2013.01)

(58) Field of Classification Search
CPC .......................... H05B 6/1227; H05B 6/1236; H05B 2213/07; A47J 27/00; A47J 27/002; A47J 27/022; Y02B 40/123
See application file for complete search history.

(56) References Cited

U.S. PATENT DOCUMENTS

| 5,687,642 A | * | 11/1997 | Chao ..................... H05B 6/1227 219/624 |
| 2003/0206572 A1 | * | 11/2003 | Dorwarth ............... H05B 3/746 374/121 |
| 2004/0099147 A1 | * | 5/2004 | Hubert ................... A47J 27/002 99/422 |
| 2004/0155032 A1 | * | 8/2004 | Koerfer ................. F24C 15/102 219/622 |
| 2011/0180530 A1 | * | 7/2011 | Jeanneteau ........... A47J 27/022 219/621 |
| 2015/0208858 A1 | * | 7/2015 | Robbins ................ A47J 45/068 426/231 |
| 2016/0135255 A1 | * | 5/2016 | Ogawa ................. H05B 6/1254 219/624 |
| 2016/0286610 A1 | * | 9/2016 | Eissner ............... A47J 27/2105 |

FOREIGN PATENT DOCUMENTS

WO WO-2007124891 A1 * 11/2007 ............... G01K 1/14

OTHER PUBLICATIONS

English translation of WO 2007/124891 (Year: 2007).*

* cited by examiner

Primary Examiner — Jun S Yoo
(74) Attorney, Agent, or Firm — Bishop, Diehl & Lee, Ltd.

(57) ABSTRACT

An induction cooking system suitable for use with a round-bottom wok is disclosed. The system includes a cooking vessel made from an induction suitable material, a base unit having an upper surface, and an induction coil and electric generator housed therein, and a control interface positioned on the base and electronically coupled to the electric generator. The upper surface of the base unit made from a ceramic and is concave to allow seating of the round-bottom wok cooking vessel on the surface. The upper surface of the base unit may include a rim at a top-most edge made of a non-magnetic material to create a gap between the upper surface and the round-bottom wok cooking vessel when seated. Preferably, the gap is greater at the center of the upper surface than at the rim of the upper surface.

15 Claims, 16 Drawing Sheets

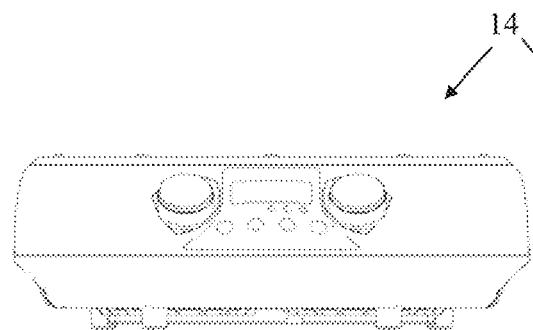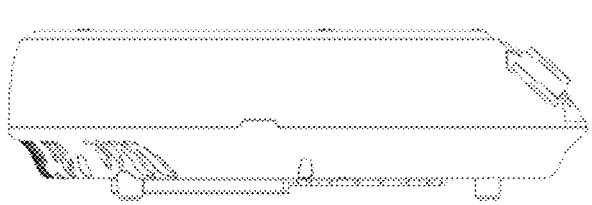
FIG. 2  FIG. 3
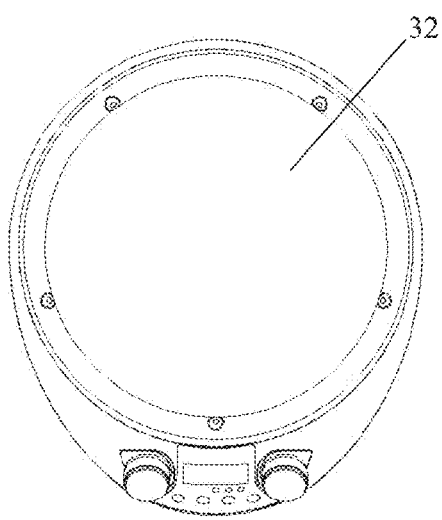
FIG. 4  FIG. 5

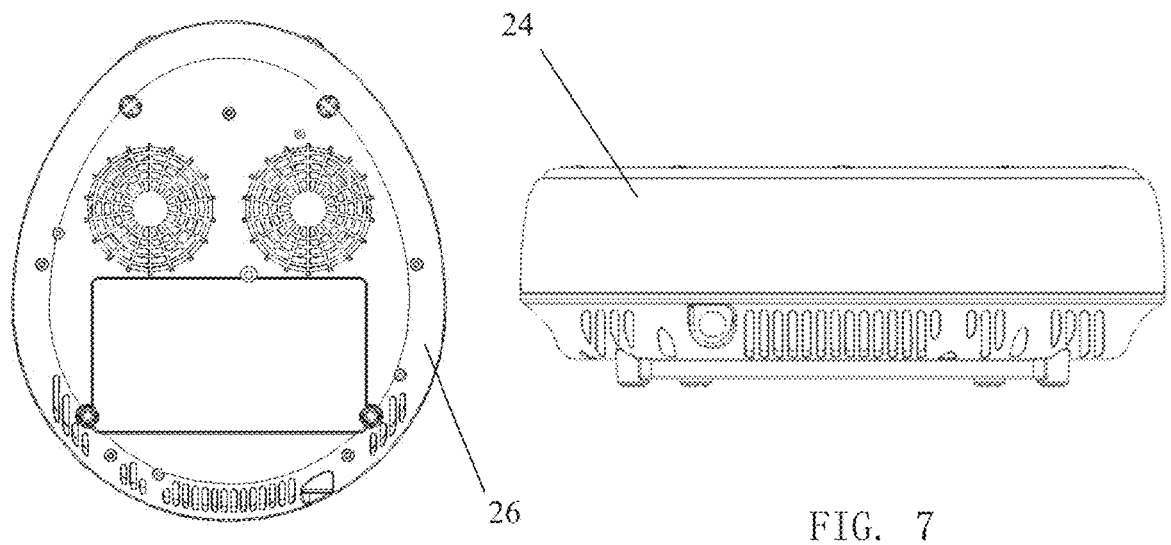
FIG. 6
FIG. 7
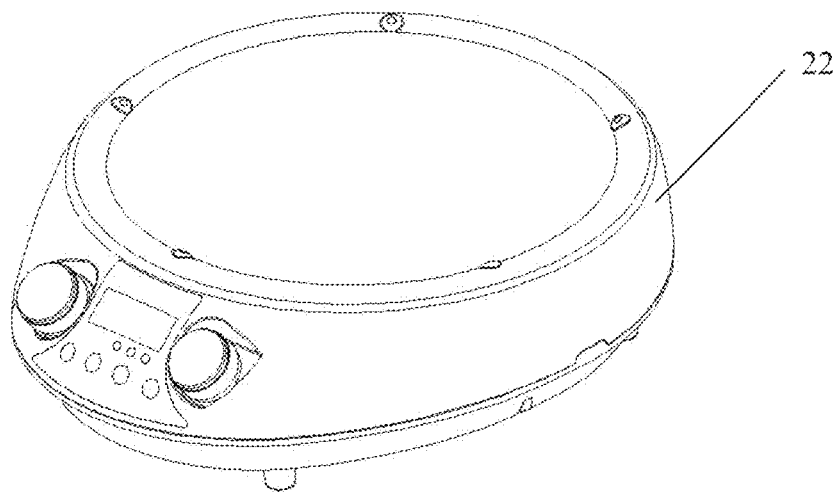
FIG. 8

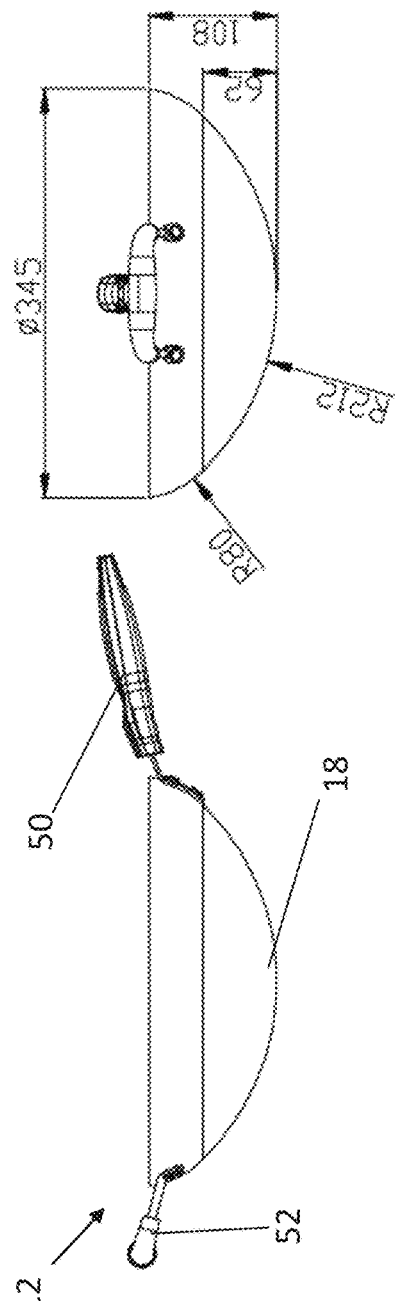
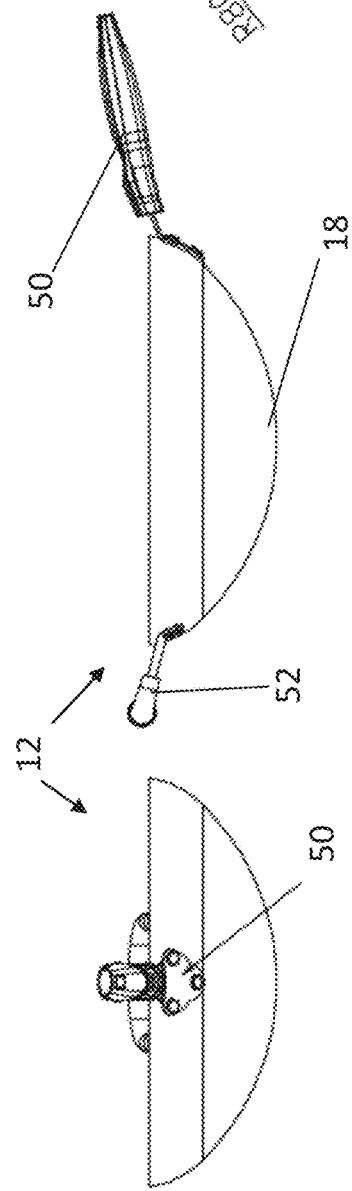
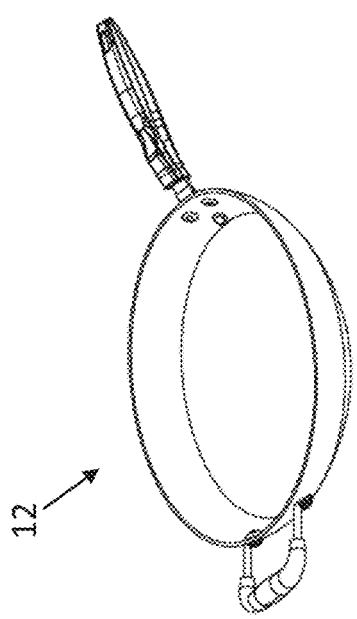
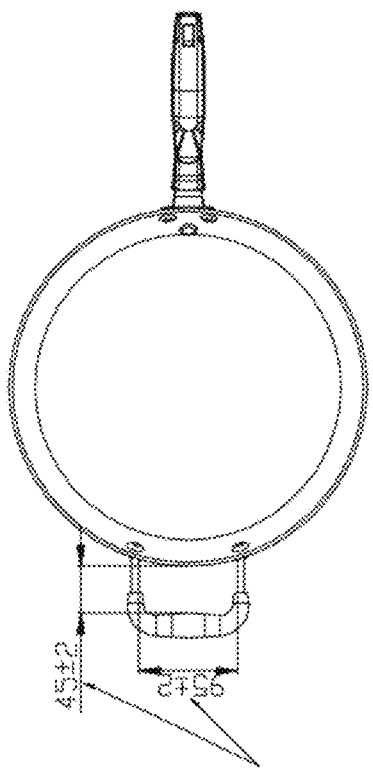
FIG. 21  FIG. 22  FIG. 23  FIG. 24  FIG. 25

INDUCTION WOK

RELATED APPLICATION

The following disclosure hereby claims the filing priority of U.S. Provisional Application No. 62/443,879, titled "INDUCTION WOK" and filed on Jan. 9, 2017. The '879 application is hereby incorporated by reference. This application also incorporates by reference, in its entirety, related Chinese Patent No. CN207893809 titled "Spill Intelligent Electromagnetic Kitchenware Kitchen Utensils And Appliances And Intelligent Electromagnetic Culinary Art System" filed on Jan. 18, 2018, by Applicant NuWave, Inc., the assignee of the present application.

TECHNICAL FIELD OF THE INVENTION

The present invention relates to induction cooking appliances. Specifically, the invention relates to an induction cooking wok.

BACKGROUND OF THE INVENTION

Woks are used in a range of different Chinese cooking techniques, including stir frying, steaming, pan frying, deep frying, poaching, boiling, braising, searing, stewing, making soup, smoking and roasting nuts. Wok cooking is typically done with a long handle spatula or ladle. The long handle of these utensils allow a cook to work with the food without burning their hands.

Cooking in a wok is unlike cooking in any other vessel. The wok's most distinguishing feature is its shape. Classic woks have a rounded bottom. The round bottom wok enables the traditional round spatula or ladle to pick all the food up at the bottom of the wok and toss it around easily; this is difficult with a flat bottom. Further, the bottom of a round wok can get hotter than a flat wok and so is better for stir frying.

Woks sold in western countries, including the U.S. are sometimes made with flat bottoms—which makes them more similar to a deep fryer. The flat bottom allows the wok to be used on an electric stove, where a round bottom wok would not be able to fully contact the stove's heating element. However, a flat bottom wok lacks many of the advantages of the round bottom version.

Until the invention of the present application, these and other problems in the prior art went either unnoticed or unsolved by those skilled in the art. The present inventions provides an electric cooking appliance which is capable of performing the multiple functions associated with traditional woks without sacrificing functionality, style or affordability.

SUMMARY OF THE INVENTION

There is disclosed herein an improved induction cooking system for a round-bottom wok which avoids the disadvantages of prior devices while affording additional structural and operating advantages.

Generally speaking, the induction cooking system comprises a round-bottom wok cooking vessel comprised of an induction suitable material, a base unit having an upper surface, and an induction coil and electric generator housed therein, and a control interface positioned on the base and electronically coupled to the electric generator. Preferably, the upper surface of the base unit is comprised of ceramic and is concave to allow seating of the round-bottom wok cooking vessel on the surface.

In specific embodiments of the system, the upper surface of the base unit comprises a rim at the top-most edge made of a non-magnetic material to create a gap between the upper surface and the round-bottom wok cooking vessel when seated. Preferably, the gap is greater at the center of the upper surface than at the rim of the upper surface.

In other specific embodiments of the system, the round-bottom of the wok cooking vessel is coated with enamel.

These and other aspects of the invention may be understood more readily from the following description and the appended drawings.

BRIEF DESCRIPTION OF THE DRAWINGS

For the purpose of facilitating an understanding of the subject matter sought to be protected, there are illustrated in the accompanying drawings, embodiments thereof, from an inspection of which, when considered in connection with the following description, the subject matter sought to be protected, its construction and operation, and many of its advantages should be readily understood and appreciated.

FIGS. 2-8 are various views, including front, top, side, bottom and perspective, of an embodiment of a base unit in accordance with the present disclosure;

FIGS. 21-25 include front, side, top and perspective views of an embodiment of the round bottom wok cooking vessel;

DETAILED DESCRIPTION OF THE INVENTION

Figure 1:
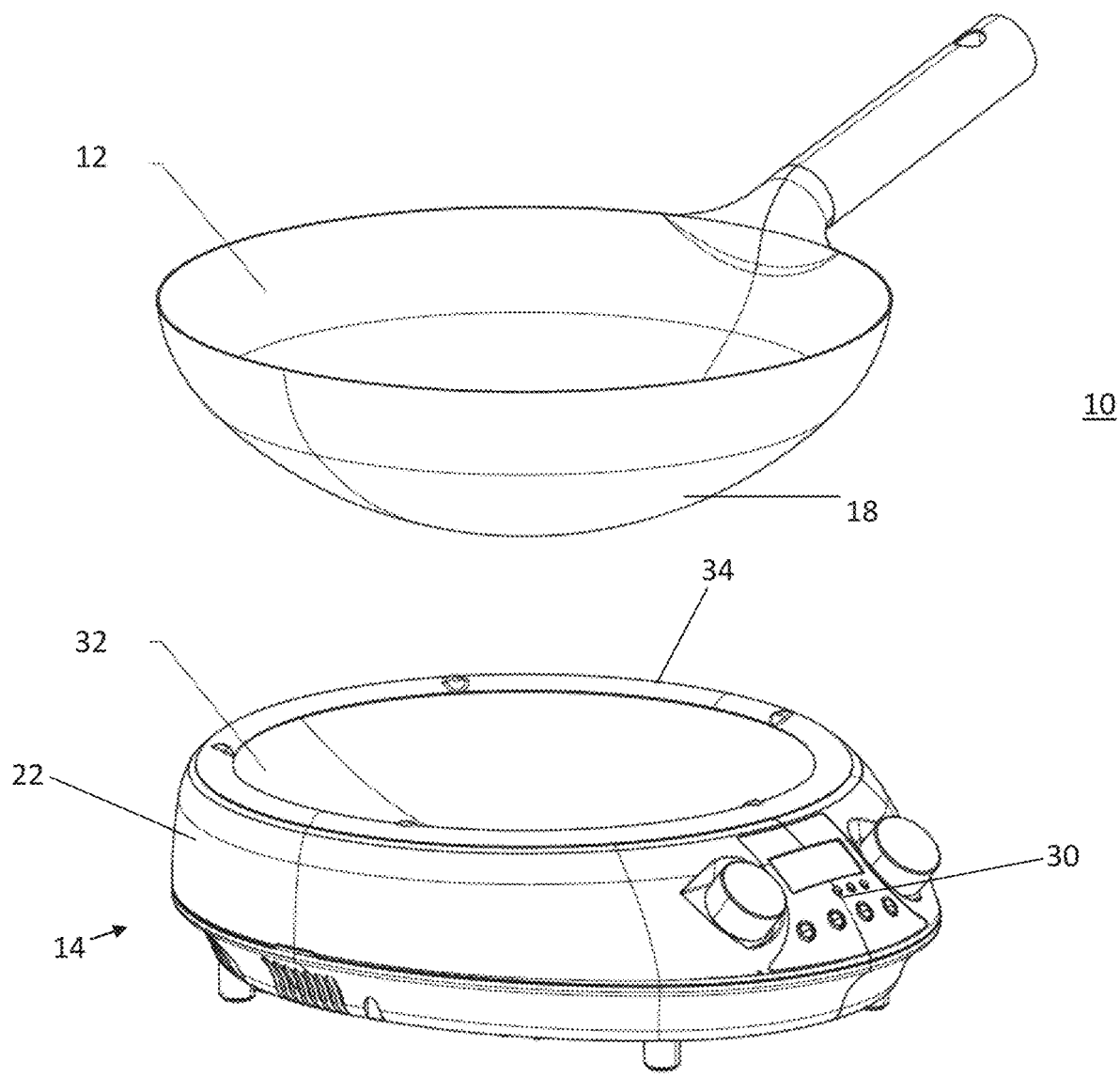
FIG. 1 is an exploded view of an embodiment of a wok and base unit in accordance with the present disclosure.

While this invention is susceptible of embodiments in many different forms, there is shown in the drawings and will herein be described in detail at least one preferred embodiment of the invention with the understanding that the present disclosure is to be considered as an exemplification of the principles of the invention and is not intended to limit the broad aspect of the invention to any of the specific embodiments illustrated.

Referring to FIGS. 1-29, there is illustrated an induction wok cooking system, generally designated by the numeral 10, and several components of the system. Generally speaking, the system 10 includes a round-bottom wok cooking vessel 12 and an induction base unit 14 having a concave upper surface 16 for proper seating of the wok cooking vessel 12.

Figure 9:
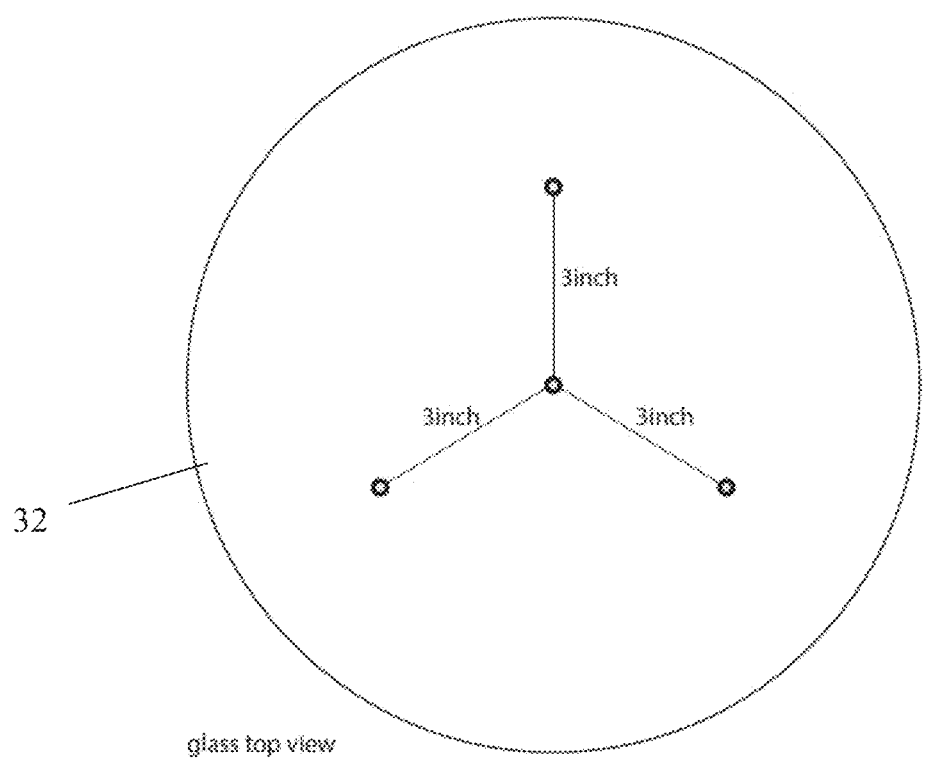
FIG. 9 is a top view of an embodiment of the glass upper surface of a base unit.
Figure 10:
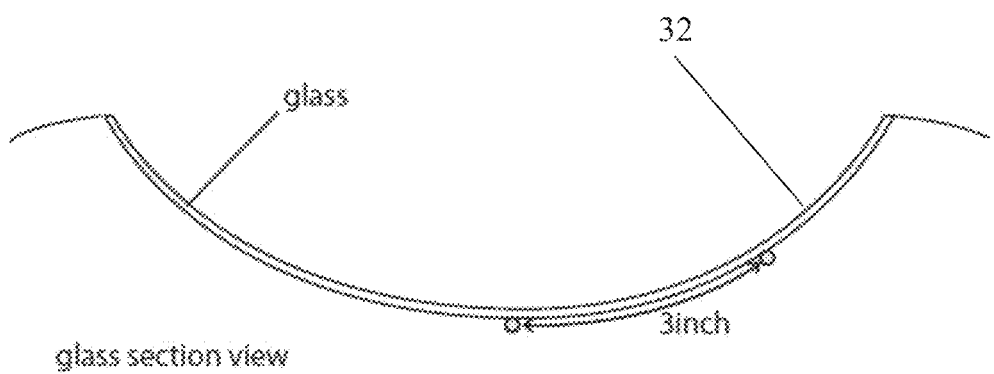
FIG. 10 is a side cross-section view of an embodiment of the glass upper surface of the base unit.

As can be seen best in FIGS. 1-10, the base unit 14 has a substantially circular heating assembly 20 seated within a base housing 22 having a user interface control panel 30 on a front surface. As shown in FIGS. 8 and 9, the base unit 14 also includes a glass or ceramic concave upper surface 32 with a non-magnetic (preferably aluminum) rim 34 encircling the uppermost edge. The contour of the concave upper surface 32 complements the convex bottom surface 18 of the wok cooking vessel 12. The upper surface 32, along with the rim 34, creates a gap between the upper surface 32 of the base unit 14 and the bottom surface 18 of the wok cooking vessel 12 when seated on the surface 32. Preferably, the gap is greater at the center of the vessel 40 (no more than about 2 mm) where the glass surface 32 is more susceptible to damage, than it is at and around an upper edge 42 of the upper surface 32 (no more than about 1 mm). The gap prevents damage to the upper surface 32 from continuous and rigorous movement of the wok cooking vessel 12 during cooking.

Figure 11:
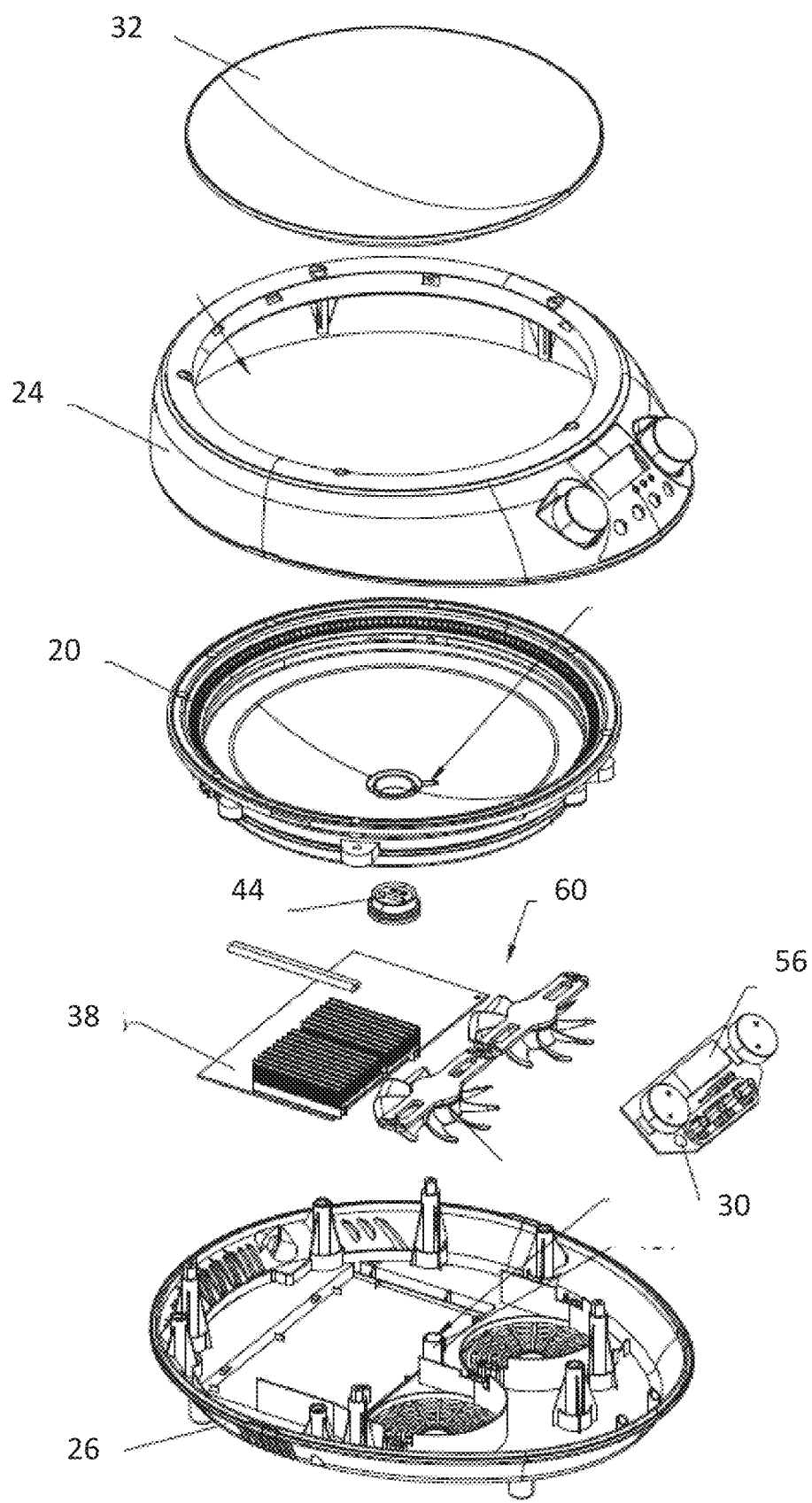
FIG. 11 is an exploded view of the base unit shown in FIG. 1.

FIG. 11 illustrates the base unit 14, including internal components. As previously noted, the base unit 14 is comprised of a heating assembly 20, an upper surface 32, a rim 34, a base housing 22 having upper section 24 and lower section 26, a user interface 30 and control circuitry 38. A thermistor 44 is also positioned within the base unit 14. The NTC thermistor 44 is located within the heating assembly 20, just below and in contact with the upper surface 32. The thermistor 44 is able to accurately detect the temperature of the surface 32 for greater temperature control. This feature helps improve power efficiency by regulating the temperature of the cooking surface 32. Additionally, cooling fans 60 are used to prevent overheating of components within the base unit 14.

Figure 12:
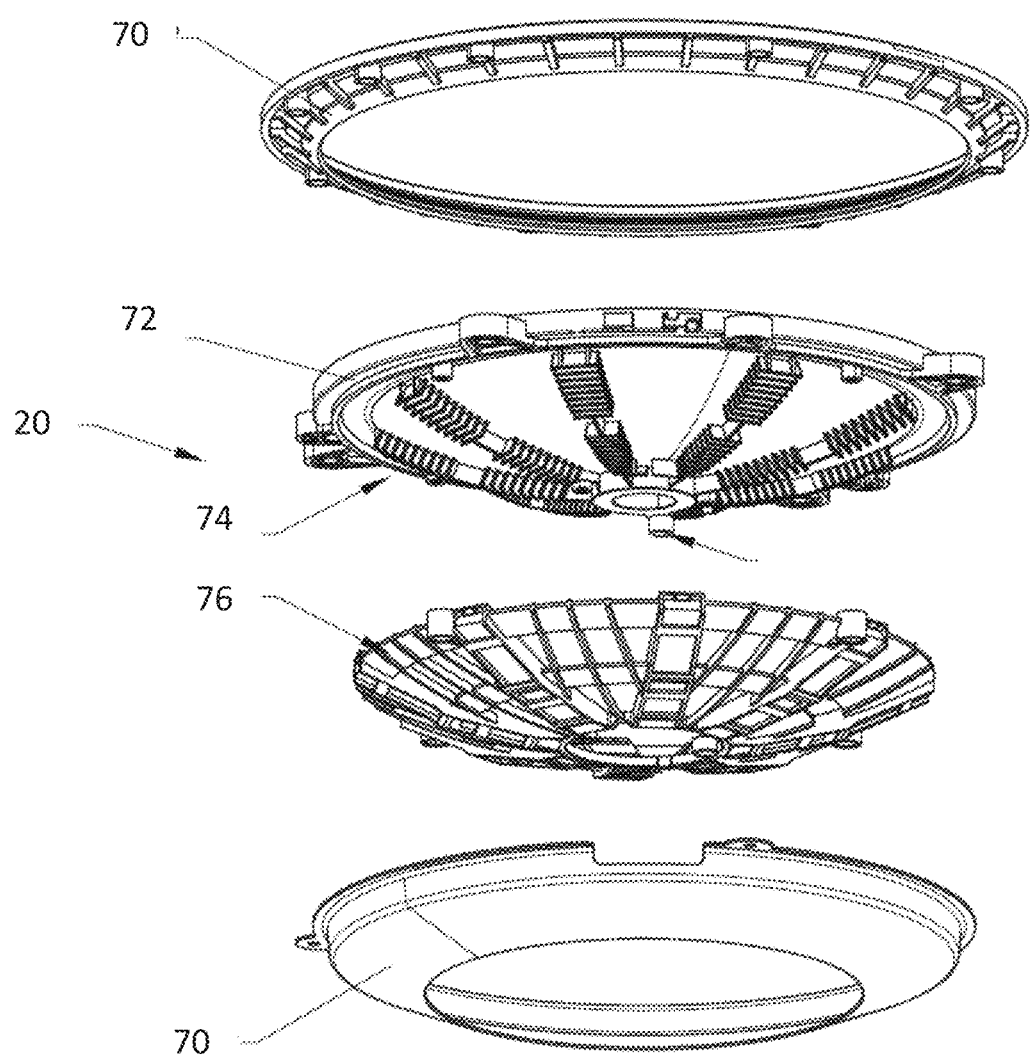
FIG. 12 is an exploded view of an embodiment of the heating assembly as shown in FIG. 11.
Figure 13:
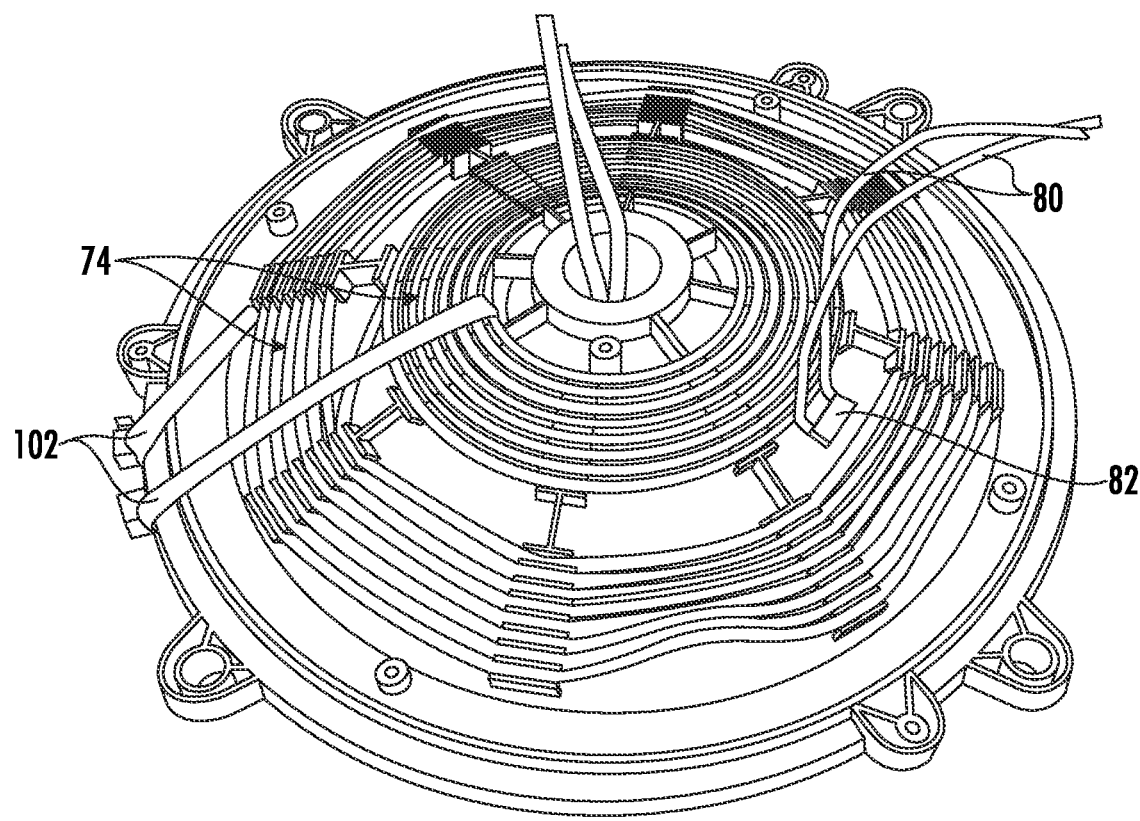
FIG. 13 is a bottom view of an embodiment of the induction heating coil in accordance with the present disclosure.

As shown in FIGS. 12 and 13, the induction heating assembly 20 is comprised of a two-piece housing 70 containing a heating plate 72 having the induction heating coil 74 positioned on a back surface and sandwiched by a heat shield 76. Power is conducted to the heating coil 74 by wires 80 coupled to terminals 82 electrically connected to the coil 74.

Figure 14:
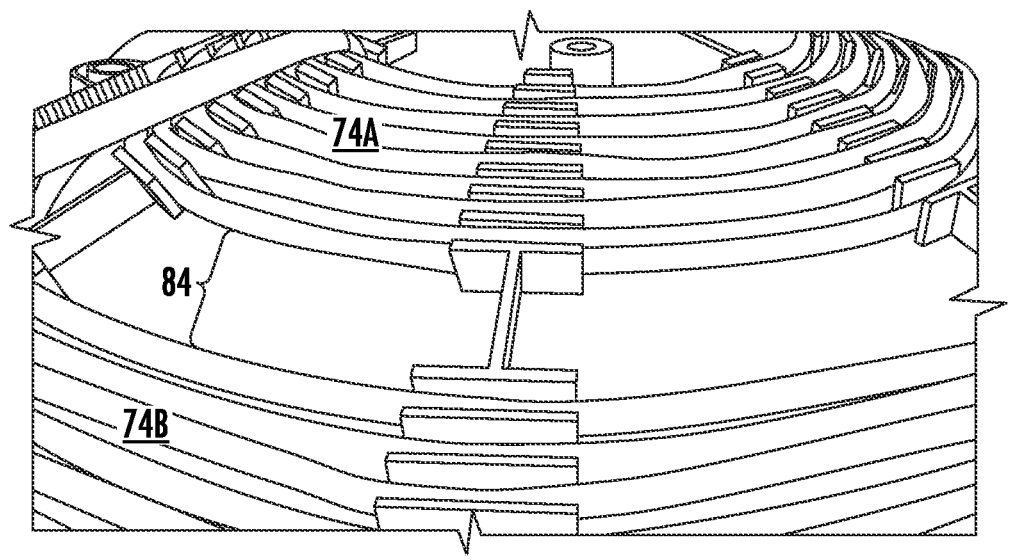
FIG. 14 is a close up view of the induction coil of FIG. 13.
Figure 15:
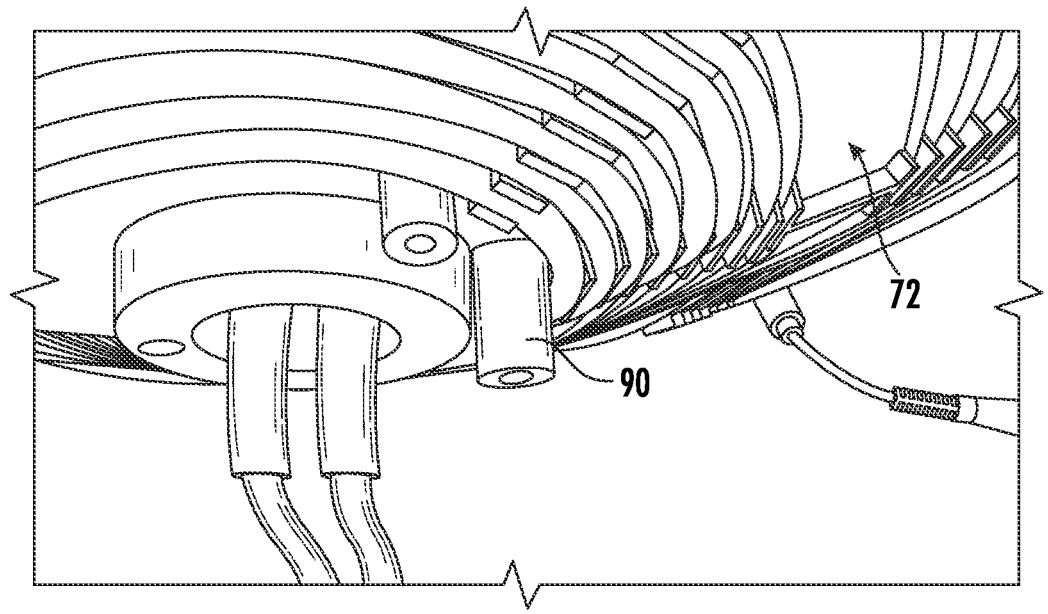
FIG. 15 is a close up view of the underside of an embodiment of the heating plate.
Figure 16:
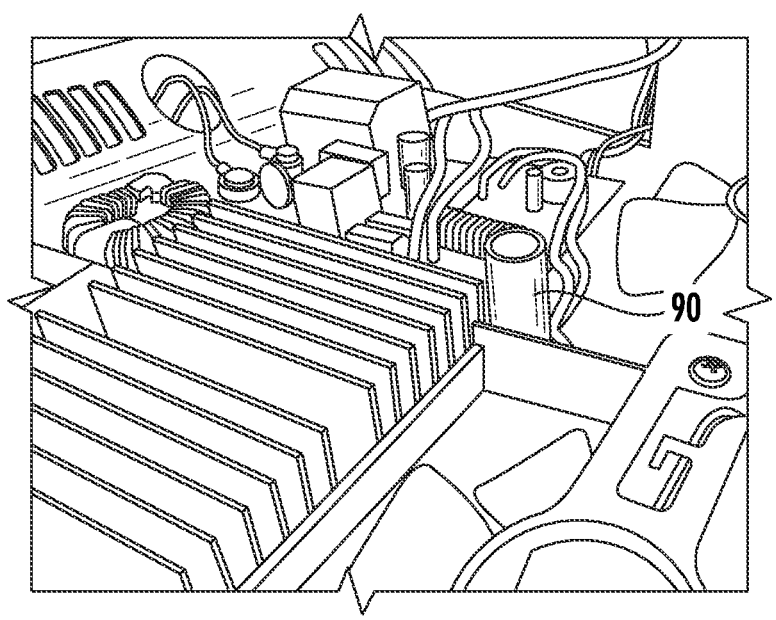
FIG. 16 is a close up view of a drain tube in the base unit.
Figure 17:
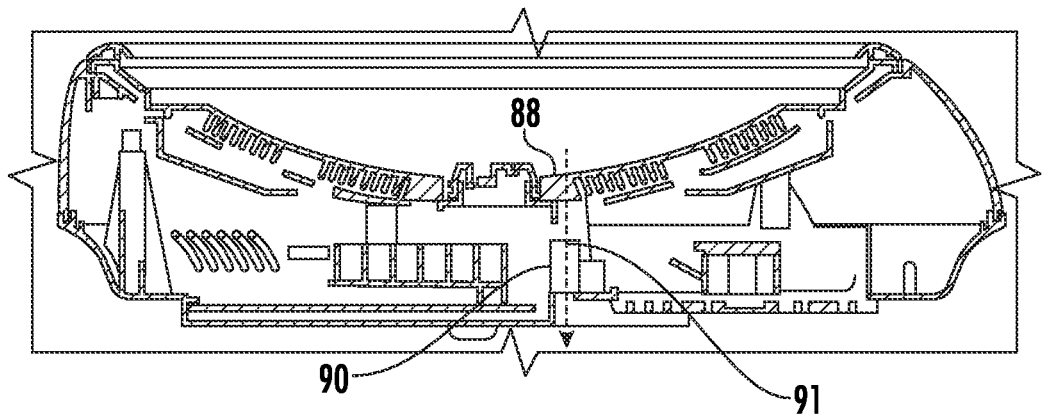
FIG. 17 is a cross section of an embodiment of the base unit.
Figure 18:
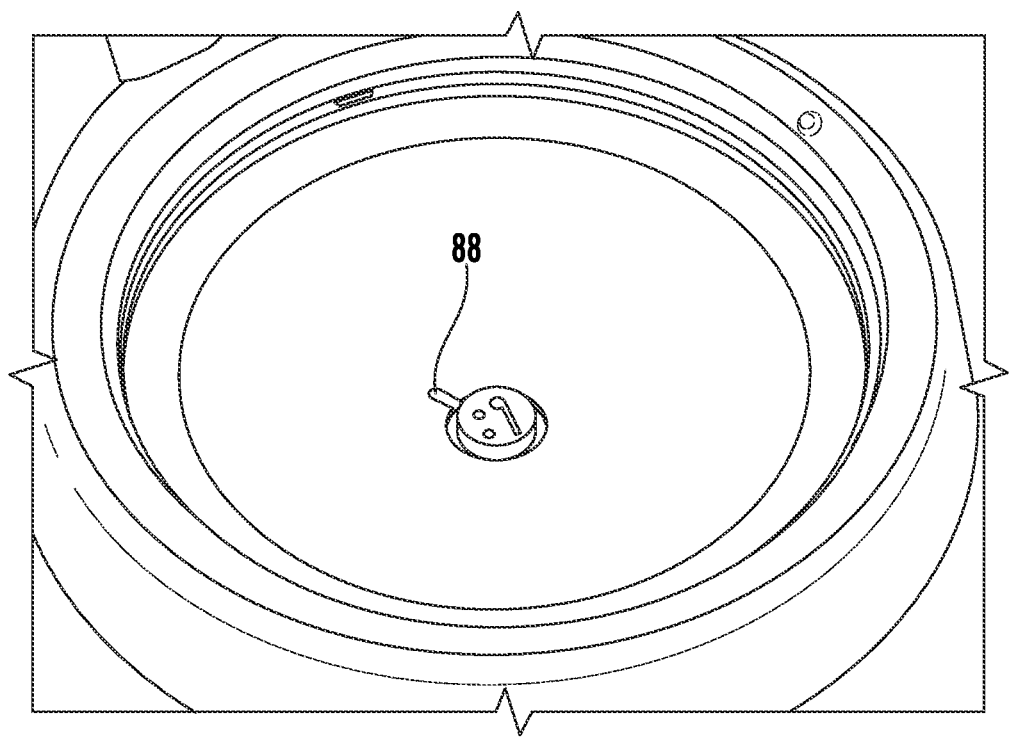
FIG. 18 is a top view of the heating plate with the upper surface removed.
Figure 19:
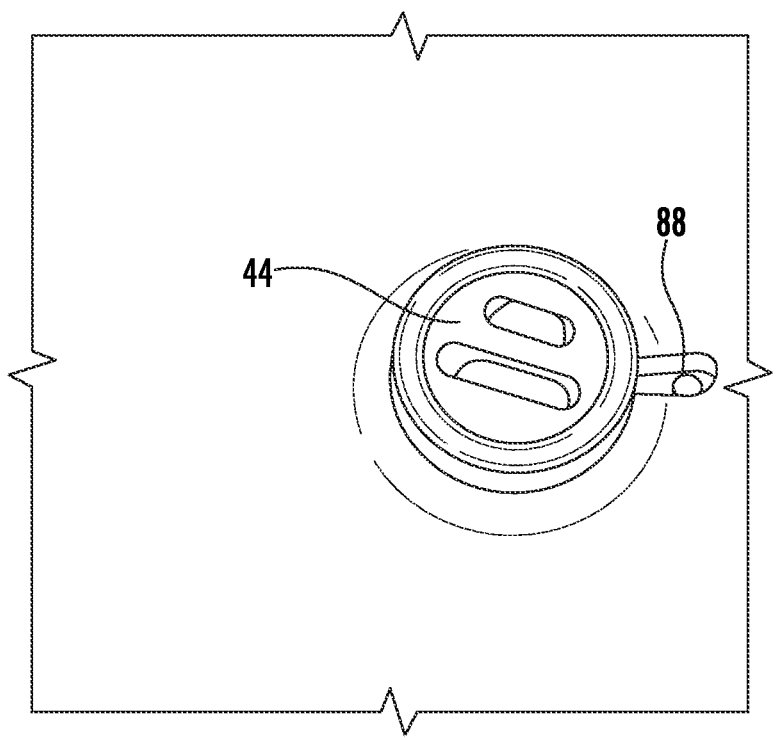
FIG. 19 is close up view of an NTC thermistor and drainage opening in the heating plate.

FIG. 14 illustrates a space 84 between two sections A, B of the heating coil 74. The spacing has been found to provide a larger heating area without increasing the heating coil size or power to the cooking system 10. Further, no loss of heat has been found to exist in the heating plate 72 as a result of the space 84. Preferably, the first section A is about 32 mm wide, the second section B is also about 32 mm wide, and the space is about 15 mm wide.

The present cooking system 10 also includes an important liquid drainage mechanism, as shown in FIGS. 15-19. That is, should the cooking surface 32 become cracked, for example, during the cooking process, cooking oils and other food material may leak into the base unit 14. However, by providing aperture 88 in the heating plate 72 (proximate NTC thermistor 44), such leakage is readily drained through aperture 88 into drain tube 90 and out the lower section 26 of the base housing 22. The liquid drain path 91 is best illustrated by the arrows in FIG. 17. This drainage feature prevents harmful and potentially corrosive liquids from contacting the control circuitry 38.

Figure 20:
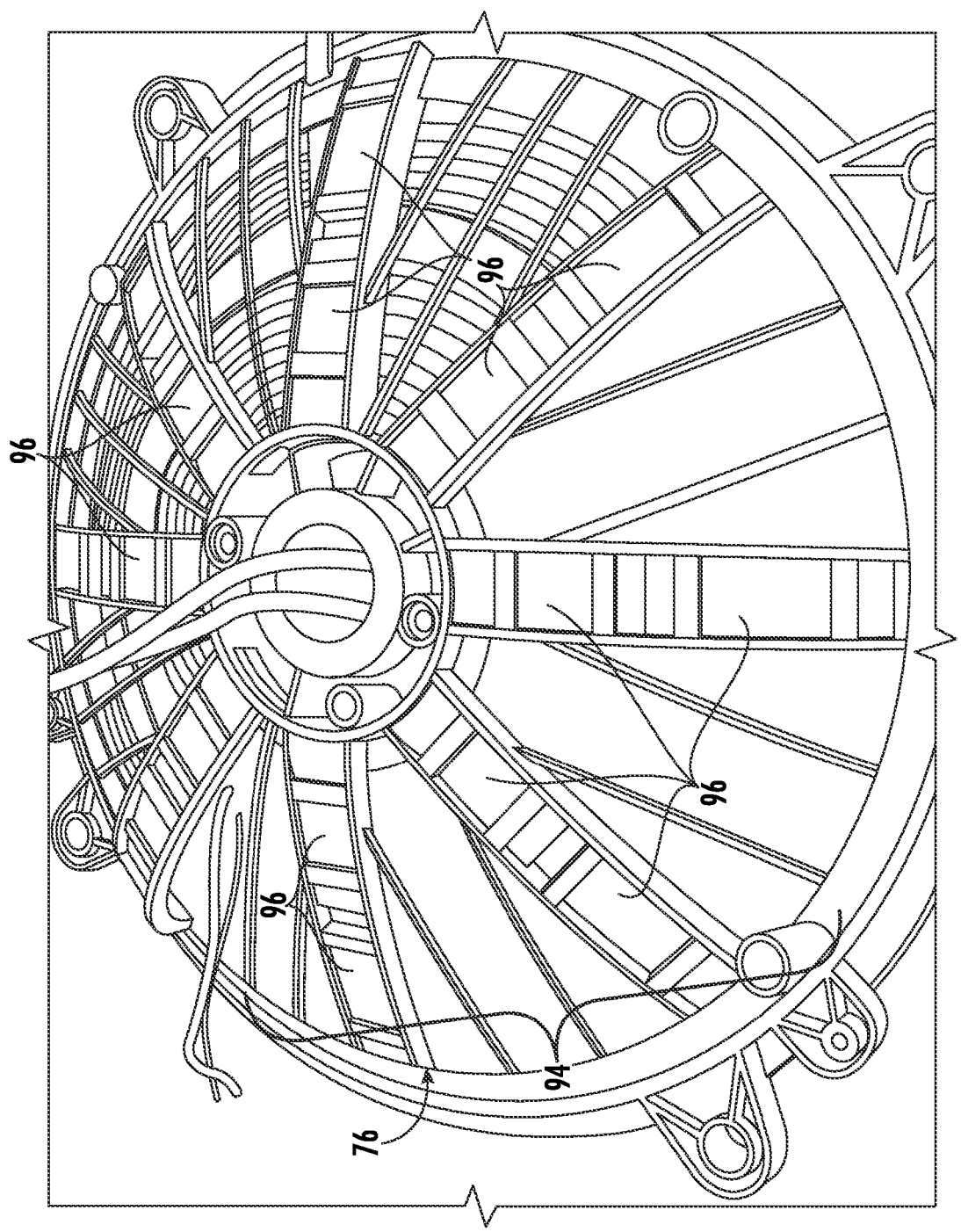
FIG. 20 is a close up view of the underside of the heat shield showing the ferrite core assembly.

FIG. 20 is an underside view of the heat shield 76 showing the ferrite core assembly 94. The core assembly 94 preferably consists of 16 spaced ferrite cores 96 to shield the control circuitry from the harmful electromagnetic interference created by the induction coil 74. The positioning of the cores 96 has been found most effective at reducing, if not eliminating, electromagnetic noise.

Referring to FIGS. 21-25, an embodiment of the round-bottom wok cooking vessel 12 (hereafter "wok") is illustrated. The wok 12 is made from an induction suitable material (e.g., magnetic materials including cast iron, steel, and magnetic stainless steel). Preferably, at least a portion of the bottom surface 18 of the wok 12 is coated-enamel. In most respects, the wok 12 is a traditional vessel having a first long handle 50 and, optionally, a second handle 52.

Figure 26:
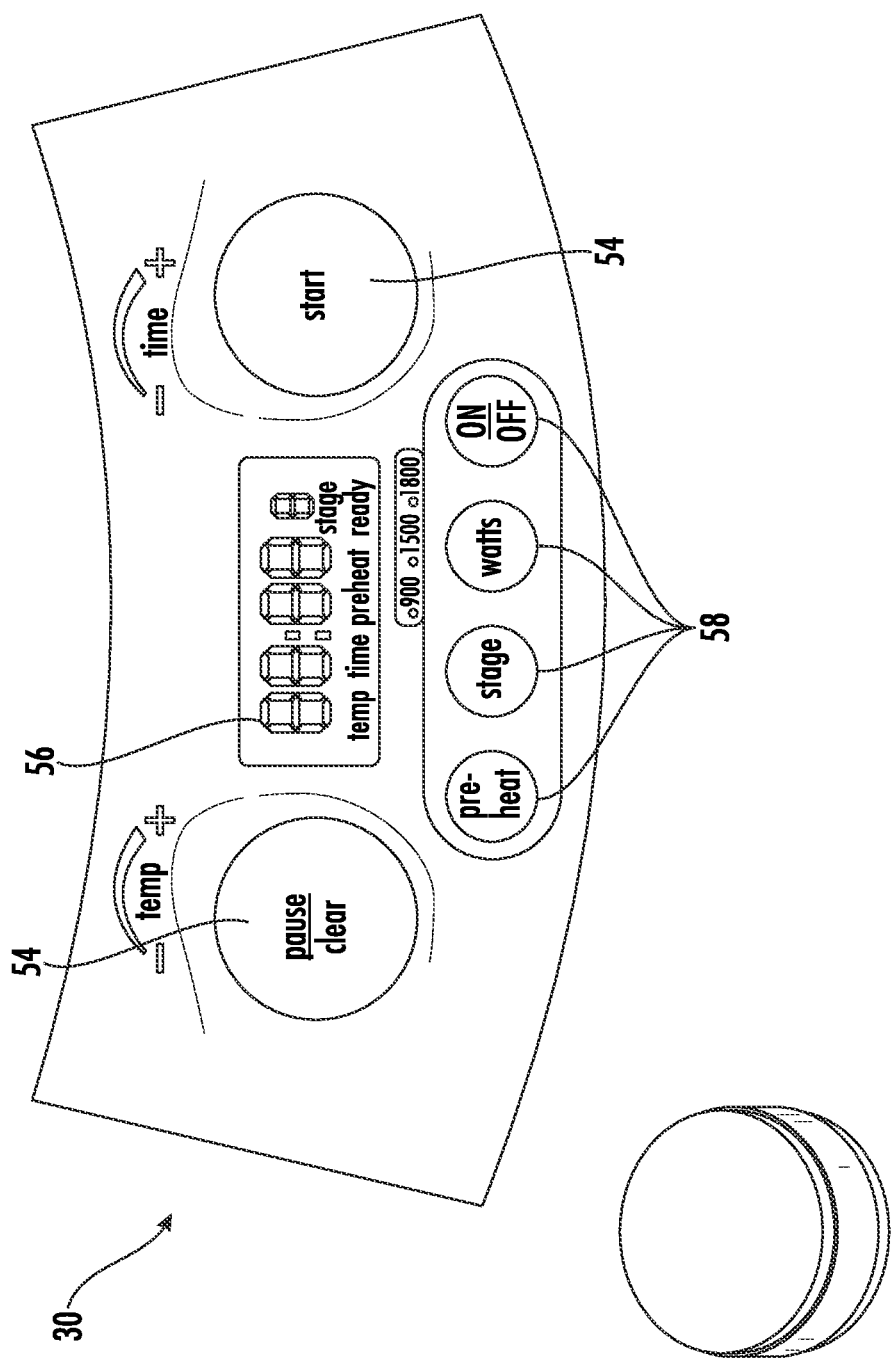
FIG. 26 is a front view showing a control interface and overlay in accordance with the present disclosure.
Figure 27:
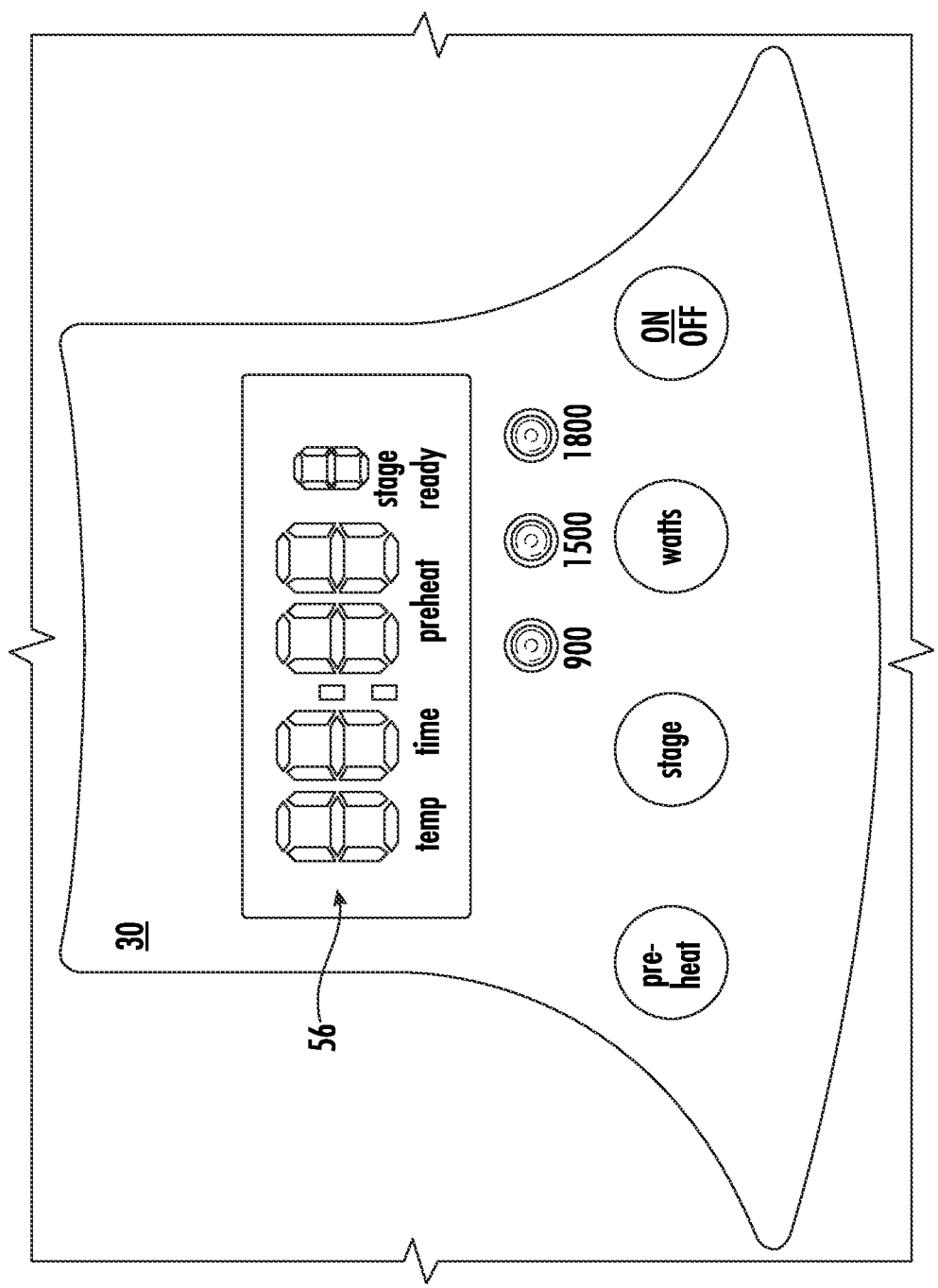
FIG. 27 is a close up of an embodiment of the display for the control interface as shown in FIG. 26.

FIGS. 26-27 are illustrative of the user control interface 30. Preferably, the interface 30 includes control knobs 54 for time and temperature, a display panel 56, and input buttons 58. The control knobs 54 may also be used as toggle switches (push control) to start/stop and clear programmed operations, as will be explained in further detail below.

In a preferred embodiment, the operation and control of the induction cooking system 10 with reference to the control interface is described as follows:

1. ON/OFF Button
    Press ON/OFF button to turn power to base unit on and off.
    Once turning on, LED screen displays "0".
2. LEFT (Temperature) DIAL
    a) ROTATING FUNCTION
        As soon as the dial rotates, "temp" and default temp "375 F" appears on screen.
        As you rotate the dial, the temp value will increase/decrease in increments of 5 degrees between 100 F and 575 F.
        Rotate dial counter clockwise in order to lower the temperature.
        Rotate dial clockwise in order to increase the temperature.
    b) PRESSING FUNCTION (PAUSE/CLEAR)
        Before cooking starts (setting time/temp & programming) when you press pause/clear, all setting clears and the screen will display "0"
        When you press pause/clear during cooking, the cooking process will pause; and the LED screen display F (temp display) will blink.
        Press Start to resume the cooking process
        Press pause/clear once more, the cooking process will clear and the screen will display "0".
3. RIGHT (Time) DIAL
    a) ROTATING FUNCTION
        As soon as the dial rotates, "time" and default time "20" appears on screen.
        As you rotate the dial, the time value will increase/decrease in increments of 1 minute. Maximum time is 99 hours and 59 minutes.
        Rotate dial clockwise in order to add more time.
        Rotate dial counter clockwise in order to decrease time value.

b) PRESSING FUNCTION (START)
Press the dial to start the cooking process.
Press Start without setting any time or temp or preheat, by default the unit will start cooking at default temperature of "375 F" and default time of "20" minutes.
4. PRE-HEAT Button
Press "pre-heat" to add pre-heating stage before cooking.
Default pre-heat temperature is "375 F".
Pre-heat button can be pressed at any time during set-up, then pre-heat process will be added before the main cooking starts.
The unit will pre-heat to the same temperature as the main cooking temperature or the $1^{st}$ stage cooking temperature. For example, if you press "pre-heat" and set to cook at 300 F for 10 minutes. The unit will pre-heat until it reaches 300 F (so there is no default pre-heat time).
Once preheated, the unit will beep and the screen will show "ready". The temperature will remain the same for 5 minutes until you hit the Start button.
Press Start button to start the main cooking process.
5. STAGE Button
Press stage to set stage cooking.
"Stage 1" and "temp" appears on screen with the default temperature of "375 F"
Adjust temperature using the left side dial.
Rotate right side dial to adjust the cooking time.
Press Stage once more, it will move to stage 2. Repeat steps 2-4 to add more stages.
You can enter up-to 10 stages. 10 stage displays "0" instead of 10.
Press START when you are done entering all stages.
6. WATTS Button
Press to toggle between LED indicator for 900\500\800 Watts.
Each press will advance one position.
Last selected Wattage setting before power is off is default, so a user can change default wattage.

Figure 28:
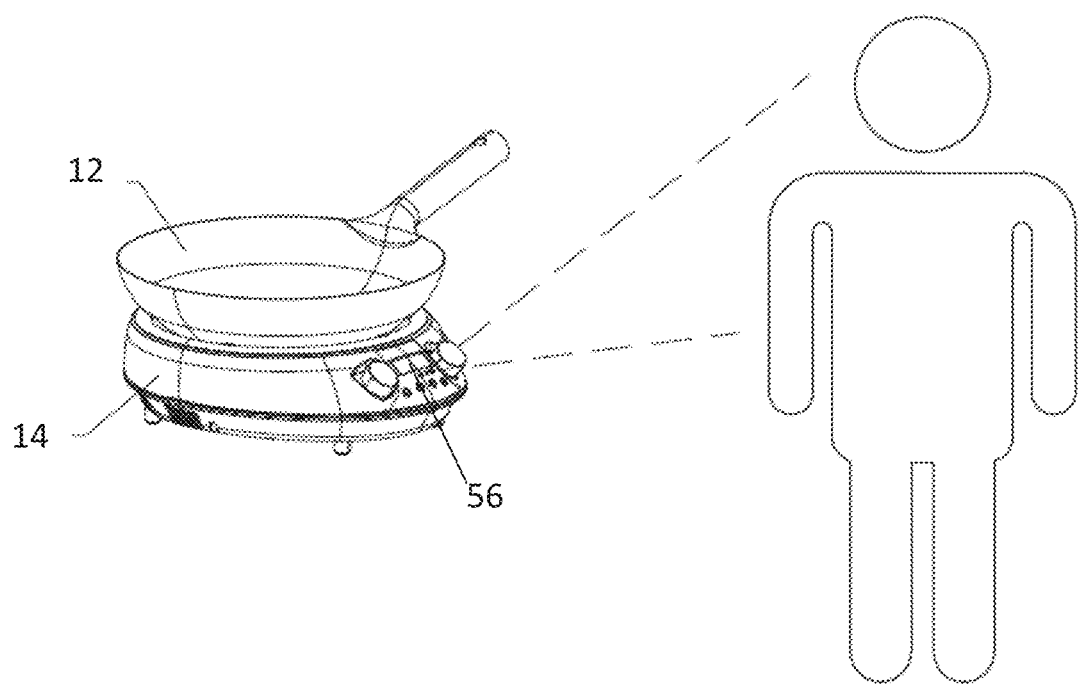
FIG. 28 illustrates visual and manual operation of an embodiment of the disclosed wok system.
Figure 29:
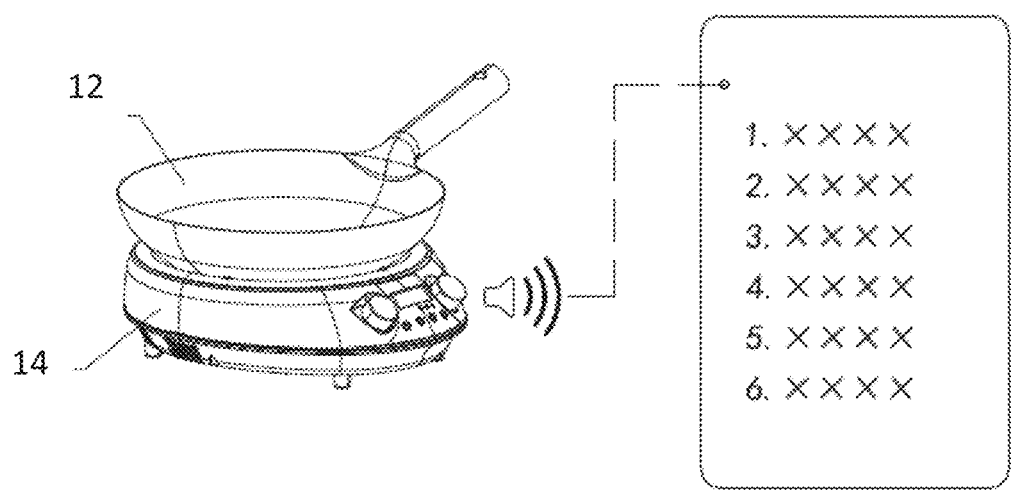
FIG. 29 illustrates an audible feature of the disclosed wok system.

Referring to FIG. 28, the display panel 56 allows a user to visually verify cook settings. The settings may be changed, as detailed above, by manually operating the knobs 54 and buttons 58 of the interface 30. Optionally, an audible signal may be provided, as shown in FIG. 29, which may be used to announce operations (1-6), time settings, temperature settings, power settings, on/off conditions, as well as any other important cooking parameters.

Figure 30:
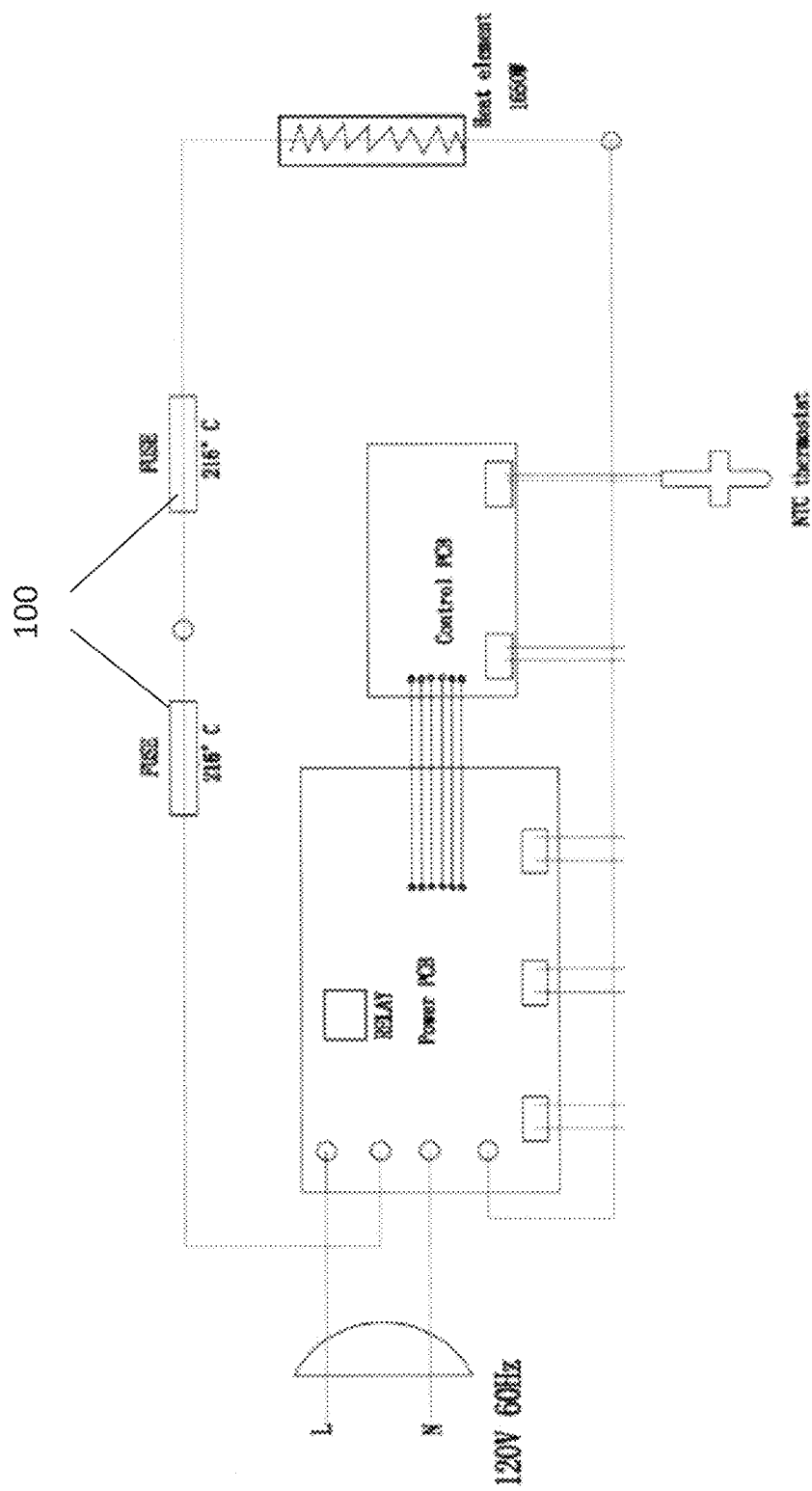
FIG. 30 is a schematic of an embodiment of a safety circuit for the disclosed induction cooking system.

Finally, as shown in FIG. 30, a preferred control circuitry schematic shows the controls having not one, but two safety fuses or switches 100 and electric generator 102. The redundant fuse configuration significantly reduces the possibility of motor overload and overheating during operation.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of applicants' contribution. The actual scope of the protection sought is intended to be defined in the following claims when viewed in their proper perspective based on the prior art.

What is claimed is:

1. An induction cooking system comprising:
    a round-bottom wok cooking vessel comprised of an induction suitable material;
    a base unit having an upper surface, and an induction coil and an electric generator housed therein;
    a control interface positioned on the base and electronically coupled to the electric generator; and
    a safety circuitry comprised of a first switch and a second switch connected in series to prevent the induction coil from overheating.

2. The induction cooking system of claim 1, wherein the upper surface of the base unit is comprised of a ceramic material and is concave to allow seating of the round-bottom wok cooking vessel on the surface.

3. The induction cooking system of claim 1, wherein the upper surface of the base unit comprises a rim at the top-most edge made of a non-magnetic material to create a gap between the upper surface and the round-bottom wok cooking vessel when seated.

4. The induction cooking system of claim 3, wherein the gap is greater at the center of the upper surface than at the rim of the upper surface.

5. The induction cooking system of claim 4, wherein the gap varies in size within the range of between about 1 mm and 2 mm.

6. The induction cooking system of claim 1, further comprising a heat shield, wherein the induction heating coil is positioned between the upper surface and the heat shield.

7. The induction cooking system of claim 1, wherein the control panel comprises preset inputs.

8. An induction cooking system comprising:
    a round-bottom wok cooking vessel comprised of an induction suitable material;
    a base unit having an upper surface, a rim at the top-most edge of the upper surface and made of a non-magnetic material, and an induction coil and an electric generator housed therein;
    a control interface positioned on the base and electronically coupled to the electric generator; and
    a safety circuitry comprised of first and second switches connected in series which stops the induction heating coil from overheating;
    wherein the rim creates a gap between the upper surface and the round-bottom wok cooking vessel when seated, and the upper surface of the base unit is comprised of a ceramic material and is concave to allow seating of the round-bottom wok cooking vessel on the surface.

9. The induction cooking system of claim 8, further comprising a drainage opening within the base unit to allow liquids leaked into the base unit from the upper surface to be drained out a bottom of the base unit.

10. The induction cooking system of claim 8, wherein the induction coil comprises a first section and a second section separated by a space having a width greater than a distance between any adjacent coil loops in either section.

11. The induction cooking system of claim 10, wherein the width of the space is in the range of 10 to 20 mm.

12. The induction cooking system of claim 11, wherein the width of the space is 15 mm.

13. The induction cooking system of claim 8, further comprising a ferrite core assembly below the induction coil to reduce electromagnetic noise.

14. The induction cooking system of claim 13, wherein the ferrite core assembly comprises at least 12 ferrite cores.

15. The induction cooking system of claim 13, wherein the ferrite core assembly comprises 16 ferrite cores.

* * * * *